United States Patent
Mummidi

(10) Patent No.: US 11,061,556 B2
(45) Date of Patent: Jul. 13, 2021

(54) COMPUTER DEVICE HAVING VARIABLE DISPLAY OUTPUT BASED ON USER INPUT WITH VARIABLE TIME AND/OR PRESSURE PATTERNS

(71) Applicant: Microsoft Technology Licensing, LLC, Redmond, WA (US)

(72) Inventor: Lakshmi Narayana Mummidi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 15/870,112

(22) Filed: Jan. 12, 2018

(65) Prior Publication Data
US 2019/0220183 A1    Jul. 18, 2019

(51) Int. Cl.
| | | |
|---|---|---|
| *G06F 3/048* | (2013.01) | |
| *G06F 3/041* | (2006.01) | |
| *G06F 3/0488* | (2013.01) | |
| *G06F 40/274* | (2020.01) | |
| *G06F 9/451* | (2018.01) | |

(52) U.S. Cl.
CPC ........ *G06F 3/04883* (2013.01); *G06F 3/0414* (2013.01); *G06F 3/04886* (2013.01); *G06F 9/451* (2018.02); *G06F 40/274* (2020.01)

(58) Field of Classification Search
CPC ............. G06F 3/04886; G06F 3/04883; G06F 3/0237; G06F 3/0414
See application file for complete search history.

(56) References Cited

U.S. PATENT DOCUMENTS

| | | | | |
|---|---|---|---|---|
| 7,614,008 | B2 * | 11/2009 | Ording | G06F 3/0482 715/773 |
| 8,490,008 | B2 * | 7/2013 | Griffin | G06F 3/0237 715/773 |
| 8,959,430 | B1 * | 2/2015 | Spivak | G06F 3/04883 715/246 |
| 9,030,436 | B2 * | 5/2015 | Ikeda | G06F 3/0414 345/174 |
| 9,104,312 | B2 * | 8/2015 | Kay | G06F 40/242 |
| 9,116,552 | B2 * | 8/2015 | Griffin | G06F 3/04886 |
| 9,213,421 | B2 * | 12/2015 | Langlois | G06F 3/0338 |
| 9,588,680 | B2 * | 3/2017 | Van Eerd | G06F 3/016 |

(Continued)

FOREIGN PATENT DOCUMENTS

WO    2011113057 A1    9/2011

OTHER PUBLICATIONS

"International Search Report and Written Opinion Issued in PCT Application No. PCT/US18/067768", dated Apr. 30, 2019, 11 Pages.

*Primary Examiner* — Daeho D Song
(74) *Attorney, Agent, or Firm* — Workman Nydegger

(57) ABSTRACT

A computer device and method are configured to receive a user input across a plurality of points on a display surface of a user interface device. The device and method detect the user input and measure an amount of an input value at each of the plurality of points. Additionally, the device and method generate and display a display output based on a predefined programmable action corresponding to the amount of the input value at at least one of the respective points varying relative to the amount of the input value at one or more of other ones of the respective points.

10 Claims, 5 Drawing Sheets

(56) References Cited

U.S. PATENT DOCUMENTS

| | | | | |
|---|---|---|---|---|
| 9,600,116 B2* | 3/2017 | Tao | ...................... | G06F 3/04166 |
| 9,612,741 B2* | 4/2017 | Brown | ................ | G06F 3/04883 |
| 9,841,895 B2* | 12/2017 | Ouyang | .............. | G06F 3/04886 |
| 9,891,811 B2* | 2/2018 | Federighi | ............... | G06F 3/0483 |
| 10,048,862 B2* | 8/2018 | Stewart | ................ | G06F 3/0488 |
| 10,359,878 B2* | 7/2019 | Seo | ...................... | G06F 3/04162 |
| 2004/0002374 A1* | 1/2004 | Brown | .................... | G07F 17/32 |
| | | | | 463/20 |
| 2004/0140956 A1 | 7/2004 | Kushler et al. | | |
| 2007/0050726 A1* | 3/2007 | Wakai | ................... | G06F 3/0486 |
| | | | | 715/769 |
| 2008/0316183 A1* | 12/2008 | Westerman | ......... | G06F 3/04883 |
| | | | | 345/173 |
| 2010/0317410 A1* | 12/2010 | Song | ................... | G06F 3/04886 |
| | | | | 455/566 |
| 2011/0018695 A1* | 1/2011 | Bells | ....................... | G06F 3/016 |
| | | | | 340/407.2 |
| 2011/0205160 A1* | 8/2011 | Song | ..................... | G06F 3/0236 |
| | | | | 345/168 |
| 2012/0154329 A1* | 6/2012 | Shinozaki | ........... | G06F 3/04886 |
| | | | | 345/174 |
| 2012/0162081 A1* | 6/2012 | Stark | .................... | G06F 3/0202 |
| | | | | 345/168 |
| 2013/0063366 A1* | 3/2013 | Paul | ..................... | G06F 3/0416 |
| | | | | 345/173 |
| 2013/0111342 A1* | 5/2013 | Alameh | ................ | G06F 3/0488 |
| | | | | 715/702 |
| 2014/0002374 A1* | 1/2014 | Hunt | ..................... | G06F 3/0488 |
| | | | | 345/173 |
| 2014/0306898 A1* | 10/2014 | Cueto | ................... | G06F 3/0234 |
| | | | | 345/173 |
| 2014/0362014 A1* | 12/2014 | Ullrich | .................... | G06F 3/016 |
| | | | | 345/173 |
| 2015/0007089 A1* | 1/2015 | Choi | ................... | G06F 3/04883 |
| | | | | 715/773 |
| 2015/0058723 A1* | 2/2015 | Cieplinski | ........... | G06F 3/04847 |
| | | | | 715/702 |
| 2015/0062052 A1* | 3/2015 | Bernstein | .............. | G06F 3/0482 |
| | | | | 345/173 |
| 2015/0067602 A1* | 3/2015 | Bernstein | .............. | G06F 3/0412 |
| | | | | 715/823 |
| 2015/0304251 A1* | 10/2015 | Greenberg | ............ | H04L 51/046 |
| | | | | 715/752 |
| 2015/0324100 A1* | 11/2015 | Greenberg | .......... | G06F 3/04847 |
| | | | | 715/765 |
| 2016/0077734 A1* | 3/2016 | Buxton | ................. | G06F 3/04883 |
| | | | | 715/773 |
| 2016/0132119 A1* | 5/2016 | Temple | ............... | G06F 3/04883 |
| | | | | 345/168 |
| 2016/0139803 A1* | 5/2016 | Yan | ....................... | G06F 3/0216 |
| | | | | 715/773 |
| 2016/0259497 A1* | 9/2016 | Foss | .................... | G06F 3/0481 |
| 2017/0168711 A1* | 6/2017 | Temple | ............... | G06F 3/04886 |
| 2017/0336969 A1* | 11/2017 | Bi | ......................... | G06F 3/04883 |
| 2018/0018086 A1* | 1/2018 | Bi | ......................... | G06F 3/0482 |
| 2018/0060295 A1* | 3/2018 | Song | ..................... | G06F 16/93 |
| 2018/0188949 A1* | 7/2018 | Kaye | .................... | G06F 3/04886 |

* cited by examiner

COMPUTER DEVICE HAVING VARIABLE DISPLAY OUTPUT BASED ON USER INPUT WITH VARIABLE TIME AND/OR PRESSURE PATTERNS

BACKGROUND

The present disclosure relates to a computer system having a touch-sensitive user interface, and more particularly, to an apparatus and method including displaying variable display outputs based on variable user input time and/or pressure patterns.

Generally, a computer device may include a touch screen display having a virtual keyboard on the screen for a user to input data into the computer device. The keyboard image displayed on the screen may be, for example, an image of a standard QWERTY keyboard with letters in the English language. The on-screen virtual keyboard is positioned on and integrated with the display screen. A touch sensitive surface of the display can be configured to detect the user's touch, swipe, and gestures on the virtual keyboard such that characters, words, and various other computer functions are displayed on the display screen. The virtual keyboard may be operated with the touch of a user's finger, or with other pointing devices such as, for example, a stylus, mouse, pen, or joystick. The virtual keyboard is often resizable and customizable so that typing modes and fonts, for example, can be changed as desired. Current versions of on-screen virtual keyboards may be also configured with a predictive text engine to predict words that users may type. The word prediction allows the users to generate text faster and avoid tedious individual character typing. In addition to word prediction, current on—screen virtual keyboards are configured to detect swipe or gesture patterns for typing words and performing computer functions such as, for example, moving pages from left to right and up and down directions. The on—screen virtual keyboards are configured to capture the path of the swipe pattern and determine the corresponding word(s). If the user desires to repeat a character or word, however, the user may still be burdened with typing characters individually before the predictive text engine predicts the correct word the user desires. As such, there exists a need for improvement when utilizing on-screen virtual keyboards and/or touch-sensitive displays.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In an implementation, a computer device includes a user interface having a display surface and configured to receive a user input across a plurality of points on the display surface. The computer device further includes a detector adjacent to the user interface and configured to detect the user input at the plurality of points on the display surface, and a measuring device in communication with the detector and configured to measure an amount of an input value of the user input at each of the plurality of points. The computer device also includes a processor in communication with at least the measuring device and configured to generate a display output based on a predefined programmable action corresponding to the amount of the input value at at least one of the respective points varying relative to the amount of the input value at one or more of other ones of the respective points. Additionally, the computer device includes a display unit in communication with the generator and configured to display the display output on the user interface device.

In another implementation, a method of generating an output on a display, including receiving a user input across a plurality of points on a display surface of a user interface device, detecting the user input at the plurality of points on the display surface, and measuring an amount of an input value of the user input at each of the plurality of points. Also, the method includes generating a display output based on a predefined programmable action corresponding to the amount of the input value at at least one of the respective points varying relative to the amount of the input value at one or more of other ones of the respective points. Additionally, the method includes displaying the display output on the user interface device.

In another implementation, a computer readable medium storing one or more programs having executable instructions by a computer device, includes instructions causing the computer device to receive a user input across a plurality of points on a display surface of a user interface device. detect the user input at the plurality of points on the display surface, and measure an amount of an input value of the user input at each of the plurality of points. The instructions further causing the computer device to generate a display output based on a predefined programmable action corresponding to the amount of the input value at at least one of the respective points varying relative to the amount of the input value at one or more of other ones of the respective points. Additionally, the instructions causing the computer device to display the display output on the user interface.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The specific features, implementations, and advantages of the disclosure will become better understood with regard to the following description, appended claims, and accompanying drawings where:

DETAILED DESCRIPTION

Figure 1:
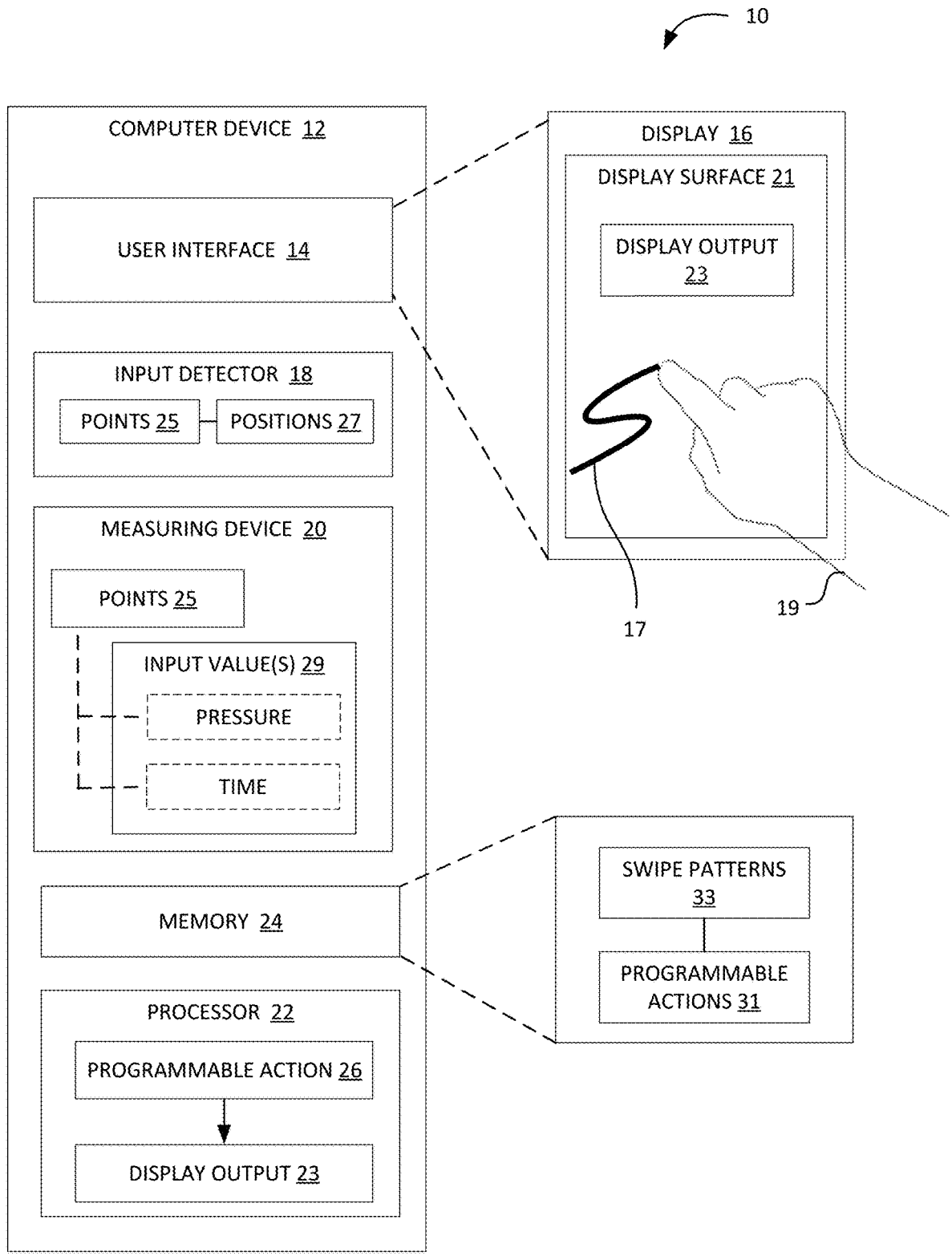
FIG. 1 is a schematic block diagram of an example computer system, according to an implementation of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure relates to a computer device configured to display variable display outputs, such as characters, words, and/or actions, based on variations in a touch input of a user. The computer device may include, but is not limited to, devices such as, for example, desktop computers, notebook computers, tablet computers, handheld computers, personal digital computers, gaming devices, media players, mobile phones, or a combination of these types of computer devices. The computer device generally includes a user interface having a touch screen display, and configured to receive the user input from a touch of a user's finger, stylus, or some other type of pointing device. The user input may be in the form of one or more of a gesture, a swipe, a swipe pattern, or a single or multiple touch from the user. According to an implementation, the computer device may include a detector, sensor, sensing device, or the like, that may be configured to detect the user input on the touch screen display, and to identify a position of a plurality of points corresponding to the user input. The computer system may also include a measuring device to measure an amount of an input value at one or more points of the user input as detected on the touch screen display. For example, the input value may be a force, pressure, time, or some combination thereof. According to an example implementation, based on the amount of pressure measured, a display output such as a graphic, for example, a character, word, or emoji, can be repeated on the display. Likewise, a user function such as, for example, highlighting text, and/or bolding or italicizing text, may be performed based on the amount of pressure and/or time and/or position measured. According to an example implementation, each detected gesture, swipe, swipe pattern, single or multiple touch from the user and a respective point or points for the action, may correspond to a predefined programmable action. For example, each measured gesture, swipe, swipe pattern, single or multiple touch from the user may be mapped to matched to a swipe pattern, and each swipe pattern may correspond to one of a plurality of predefined programmable actions. The computer system may include a processor to generate a display output based on the predefined programmable action that corresponds to the determined swipe pattern, and to display the display output on the touch screen display.

Referring to FIG. 1, an example implementation of a computer system 10 for displaying variable display outputs based on variable user input time and/or pressure patterns may include a computer device 12 having a user interface 14 configured with touch screen display 16 to receive a user input 17 from a user 19 on a display surface 21 and further configured to generate a corresponding display output 23 for presentation to the user. For example, in some cases, the user input 17 may be a continuous input of a plurality of points 25, e.g., a continuous multi-point input, such as swipe having a swipe pattern. In other cases, the user input 17 may further include one or more additional points, such as an additional area on the display surface 21 contacted by the user at a time overlapping with or before or after the continuous, multi-point input. The user interface 14 may include but is not limited to a touch screen, a touch-sensitive display, a digitizer, any other mechanism capable of receiving user input 17 from a user and generating the display output 23 for presentation to the user, or any combination thereof. The user interface 14 may be configured to sense and receive user input 17 from the touch of a finger of the user 19, but is not limited thereto and may sense and receive input from other input devices such as, for example, a stylus, mouse, pen, or joystick. The computer device 12 may also include an input detector 18 that detects the user input 17 applied to the display surface 21 of the user interface 14, including a position 27 corresponding to each of the plurality of points 25 that define the user input 17, and a measuring device 20 that measures an amount of one or more input values 29, such as a force, a pressure, a time, or a combination thereof, e.g., at each of the plurality of points 25. For example, the input detector 18 and the measuring device 20 may be separate components, or may be integral components, and may include a digitize, a force sensor, a pressure sensor, etc. Additionally, the computer device 12 may include a processor 22 in communication with a memory 24 capable of storing a plurality of programmable actions 31 in relation to one or more of each of a plurality of swipe patterns 33 that can be matched to the plurality of points 25 of the user input 17. The processor 22 may be configured to select a matching one of the plurality of swipe patterns 33, map the selected one of the plurality of swipe patterns 33 to one of the plurality of programmable actions 31, and execute the selected programmable actions 35 to generate the display output 23 for presentation by the display device 16 of the user interface 14. Thus, the computer device 12 may execute the processor 22 based on the user input 17 to present a variable display output 23, such as to display repeated or highlighted text or graphics (e.g., an emoji) and/or to perform some other display function, examples of which will be discussed in more detail below.

Figure 2:
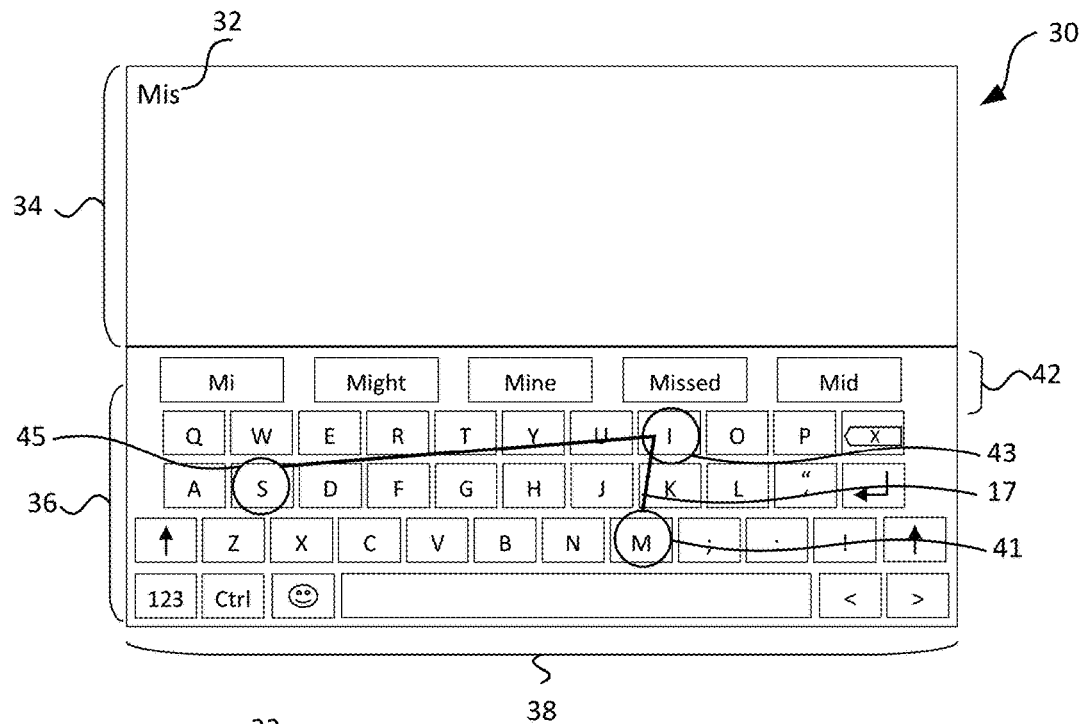
FIG. 2 is a schematic diagram of a swipe pattern across an on-screen keyboard of a computer device, according to an implementation.

Referring to FIG. 2, a computer device 30, which may be the same as or similar to computer device 12, and which may include a virtual, on-screen keyboard 36 displayed on a display 16 for a user to enter text and/or characters 32 on the display 16 based on user input 17 in the form of a swipe pattern 41, 43, 45141 across the keyboard 36. The keyboard 36 may include various keys 38, at known positions, to input text and/or characters 32 corresponding to a swipe a pattern 40, 41, 42 of user input 17 at a plurality of points/positions (as represented by circles over keys) across the keyboard 36. In some optional implementations, the computer device 30 may be equipped with the processor 22 and the memory 24 having a predictive text engine that predicts suggested text 42 based on keys 38 touched by the user. For instance, if the user begins touching the keys 38 individually or performing the user input 17 defining a swipe pattern for a word, for example, the word 'Mississippi,' the predictive text engine may automatically predict words that start with the letter 'M' (see, e.g., suggested text 42 in FIG. 2).

Figure 3:
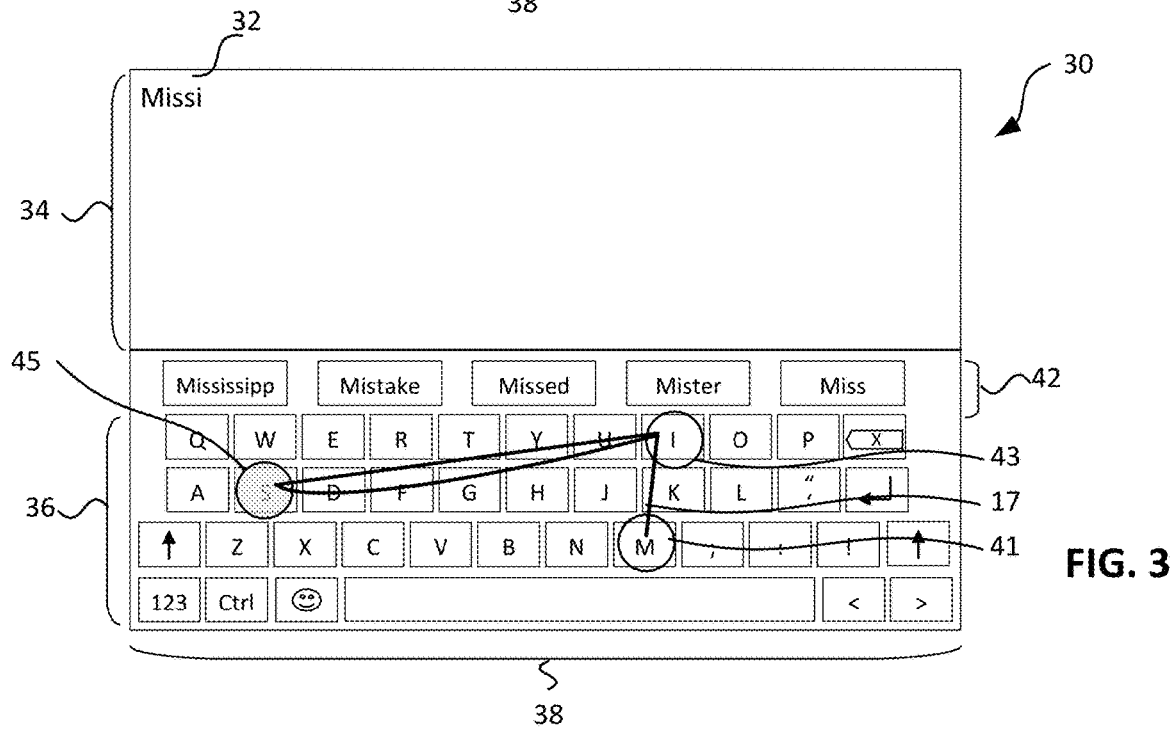
FIG. 3 is a schematic diagram of an output on a display based on pressure detected at various characters on the on-screen keyboard of the computer device in FIG. 2 with text of the characters repeated on the display, according to an implementation.

According to an example implementation, additionally referring to FIG. 3, the user input 17 at one or more points or positions may have an input value that varies relative to a threshold, and/or relative to the user input at one or more other ones of the plurality of points or positions of the user input 17, such as when swiping across certain characters or keys 38 on the keyboard 36. For instance, such variable input value may be input when the user desires for the character or key 38 in the word to be repeated. For example, if intending to type the word 'Mississippi,' the computer device 30 may be configured to enable the user input 17 to define a swipe pattern that moves across the sequence of letters 'm i s i s p i' only once, with more pressure (relative to the pressure at other positions) applied to the first 's,' the second 's,' and the 'p' along a path of the swipe pattern, thereby the computer device 30 executing processor 22 and memory 24 may be configured to repeat the first 's,' the second 's,' and the 'p' in response to detecting the increased pressure, such that those characters are repeated, resulting in the word 'Mississippi.'

Referring more specifically to FIG. 3, an example implementation of the computer device 30 may be configured to detect an amount of pressure and/or time at various positions corresponding to one or more characters on the virtual, on-screen keyboard 38 to repeat the characters on the display 16. For example, if more pressure is applied at character 's', as indicated by shaded pressure point 45, the displayed text 32 illustrates the character 's' on the display 16 being repeated. As noted above, the computer device 30 may be configured with the memory 24 having a plurality of predefined programmable actions 31 that, once the device 30 detects pressure and/or time measurements at the character 's', enables the device 30 to repeat the character 's'. Once pressure and/or time measurement is detected, the measuring device 20 can measure an amount of pressure received at character 's,' and/or an amount of time the pressure is applied, to determine whether the received user input 17 at the position of character 's' is recognized as part of a one of the plurality of swipe patterns 33 that map to one of a plurality of programmable actions 31. For example, to determine if the amount of pressure detected at the point 45 for character 's' is enough pressure to be associated with one of the plurality of swipe patterns 33, the amount of pressure may be compared to one or more pressure threshold values. For example, if the amount of pressure is less than a first pressure threshold value, the user input 17 may be recognized as a normal touch. If the amount of pressure is the same or greater than the first pressure threshold value, the user input 17 may be recognized as part of a pressurized swipe pattern that may be matched to one of the plurality of swipe patterns 33 having a corresponding one or more of the plurality of programmable actions 31. For instance, the corresponding one of the plurality of programmable actions 31 may be to repeat the input of the corresponding key 38 (e.g., at the character 's'). In addition to the amount of pressure detected at the point 45, computer device 30 and/or measuring device 20 may determine a length of time that the user input 17 is received at the position, e.g., of the character 's' in order to further determine if the user input 17 is one of the plurality of swipe patterns 33 having a corresponding one or more of the plurality of programmable actions 31. In another example implementation, the device 30 may be configured with the processor 22 having an algorithm that memorizes the user input 17 corresponding to the swipe pattern 40 when typing the word 'Mississippi' so that a predictive text engine executed by the processor 22 may more quickly predict a future input of a swipe pattern matching the word 'Mississippi.'

Figure 4:
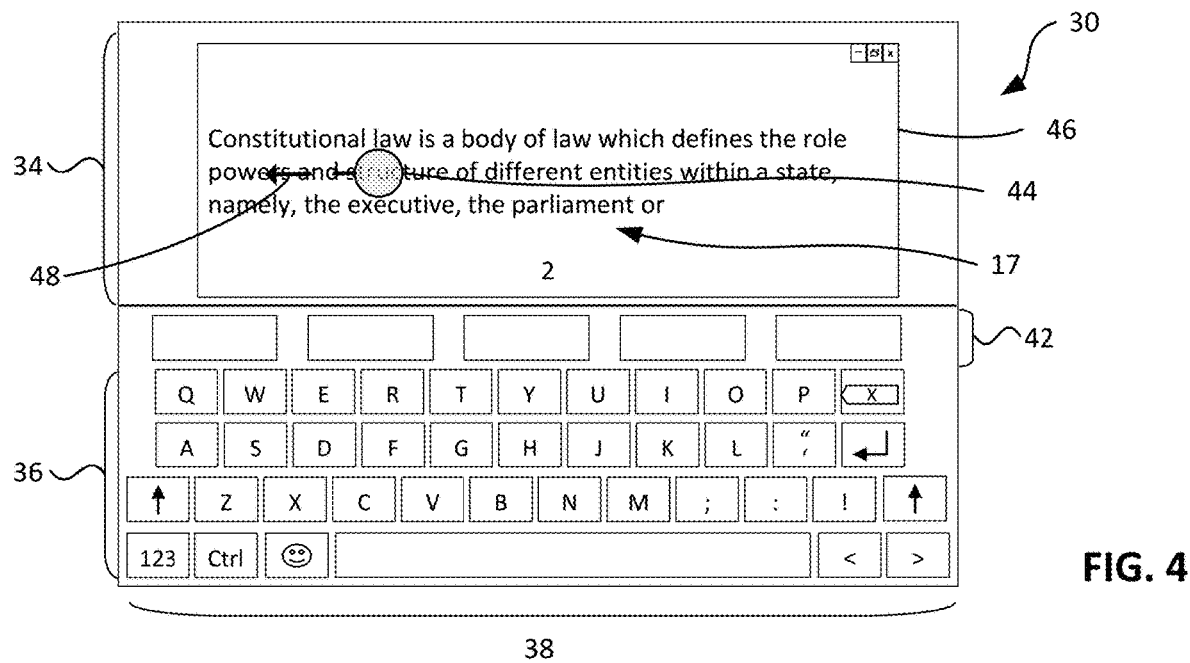
FIG. 4 is a schematic diagram of a gesture having corresponding pressure variations detected on a portion of display of the computer device separate from the on-screen keyboard, according to an implementation.
Figure 5:
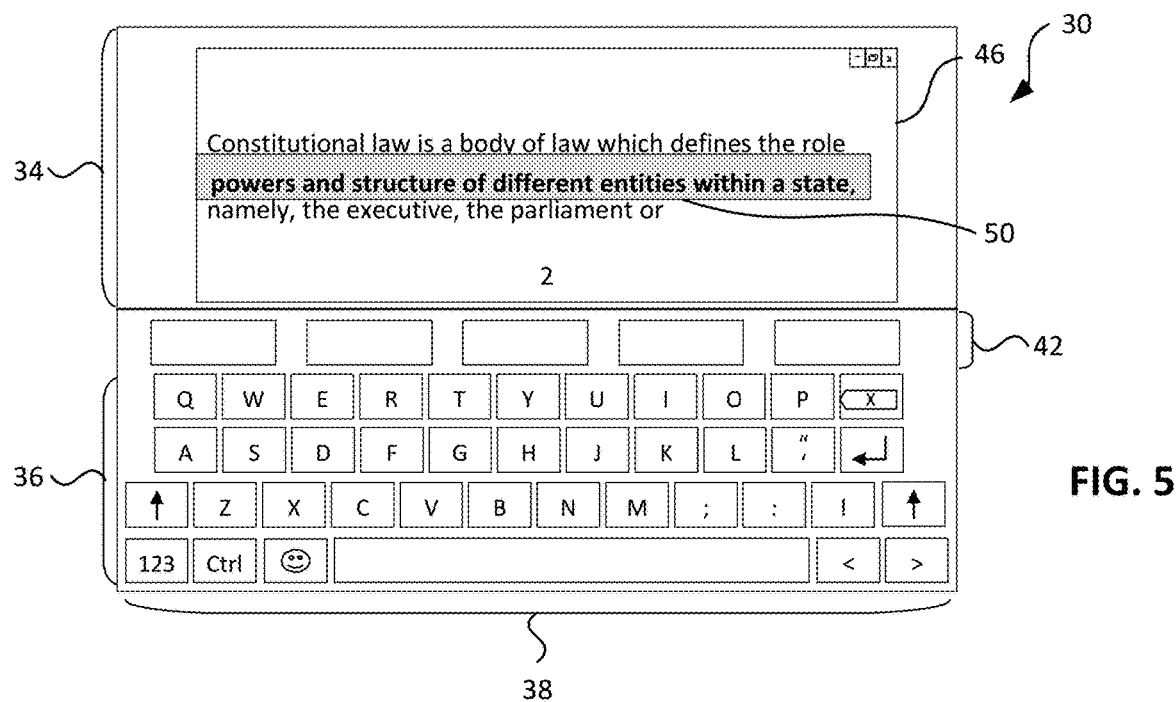
FIG. 5 is a schematic diagram of a displayed output of an action based on the pressure associated with the gesture detected on the display of the computer device in FIG. 5, according to an implementation.

Referring to FIGS. 4 and 5, another example one of the plurality of programmable actions 31 may result in a different type of display output 23 on the display 16. Namely, in this case, the user input 17 may be matched to one of the plurality of swipe patterns 33 having a corresponding one or more of the plurality of programmable actions 31, for example, corresponding to an action to highlight, bold, italicize, etc., content displayed on the display 16. In the example implementation illustrated in FIGS. 4 and 5, a user may apply the user input 17, e.g., pressure over a plurality of points, such as over content in window 46 on the display 16 at a point 44 and swipe left 48 after applying pressure at point 44. In this example implementation, pressure sensed from the user input 17 at the point 44 combined with the swipe left 48 may be recognized swipe pattern corresponding to a predefined programmable action that indicates that the user desires to highlight the text in the portion of the content shown in the window 46. Unlike a typical swipe left gesture that may be recognized as an action to move to a next page, in the present disclosure, the computer device 30 may be configured to detect the gesture to perform a different, unrelated action. For example, if the amount of pressure is less than a threshold value, the swipe pattern may be recognized as a normal swipe. If the amount of pressure is the same as or greater than the threshold value, the swipe pattern may be recognized as a pressurized swipe pattern having a corresponding programmable action. The pressurized action may be based on the amount of pressure received by the user input at a respective pressure point on the display 16 (e.g., the point 44) to signal the pressurized swipe pattern. In addition to the amount of pressure detected at the point 44, a length of time that the user input is maintained at the point 44 before performing the swipe left 48 may be detected to determine if the amount of pressure received indicates a pressurized swipe pattern.

Referring to FIG. 5, based on the detected user input 17 of FIG. 4 matching a known swiping pattern (e.g., the user input at the pressure point 44 combined with the swipe left 48 illustrated in FIG. 4), the corresponding one of the plurality of predefined programmable actions 31 corresponding with detected one of the plurality of swipe patterns 33 indicates that the user desires a highlight action 50 to highlight the content in the portion of the window 46.

Figure 6:
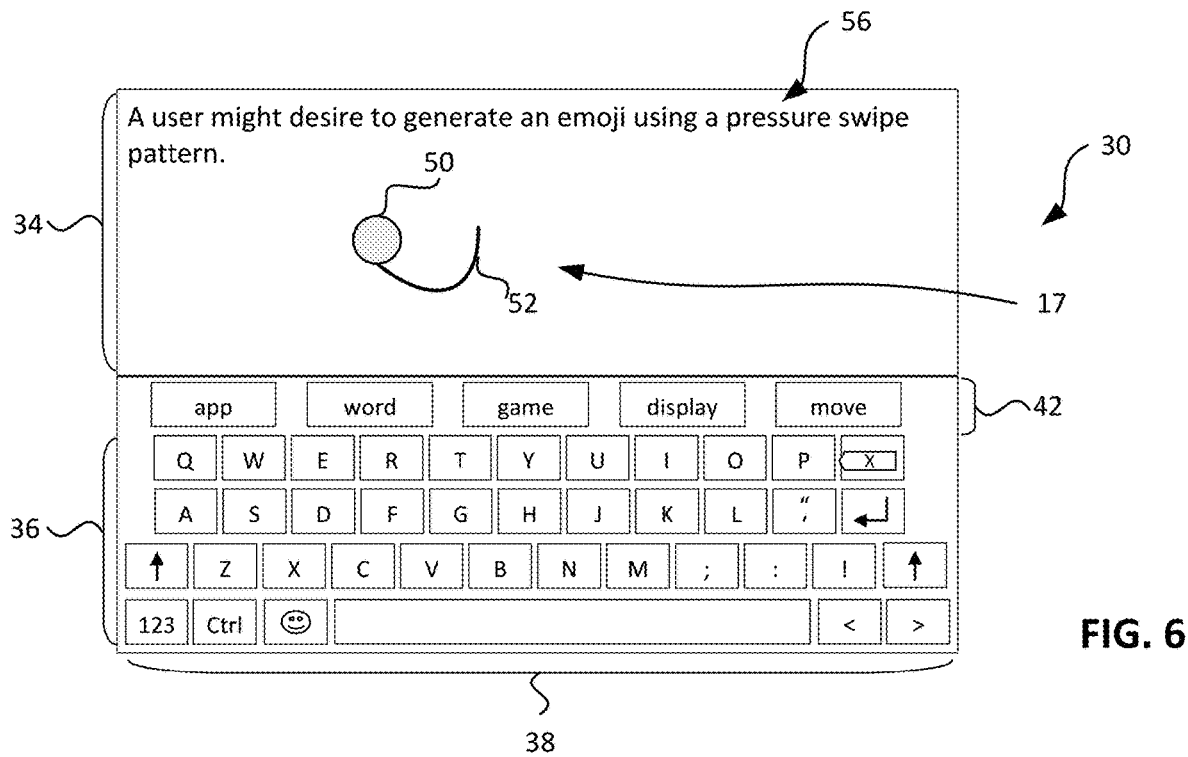
FIG. 6 is a schematic diagram of another gesture having corresponding pressure variations detected on a display of the computer device, according to an implementation.
Figure 7:
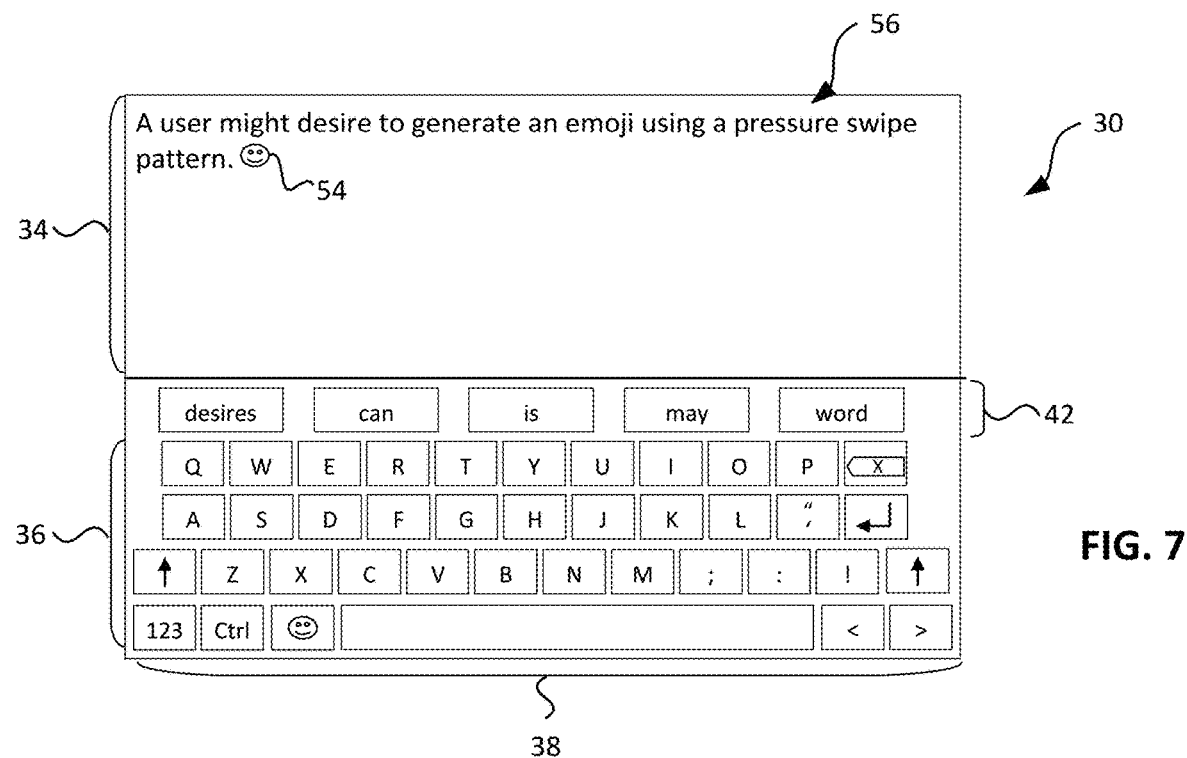
FIG. 7 is a schematic diagram of a displayed output of an action based on the pressure associated with the gesture detected on the display of the computer device in FIG. 6, according to an implementation.

Referring to FIGS. 6 and 7, an example implementation of the computer device 30 may be configured to detect pressure of the user input 17 on the display 16 to enter or repeat characters, words, or emojis. In this example implementation, the user input 17 may include receiving pressure at a point 50 and receiving a u-shaped swipe pattern 52 after receiving pressure at point 50. Pressure sensed from the user input 17 at the point 50 combined with the u-shaped swipe pattern 52 may be determined to match one of the plurality of swipe patterns 33, and the matching swipe pattern may be mapped to one of the plurality of predefined programmable action 31, in this case an action that indicates that the user desires to generate a smiley face emoji 54, as illustrated in FIG. 7, such as but not limited to at the end of existing, displayed text 56.

Figure 8:
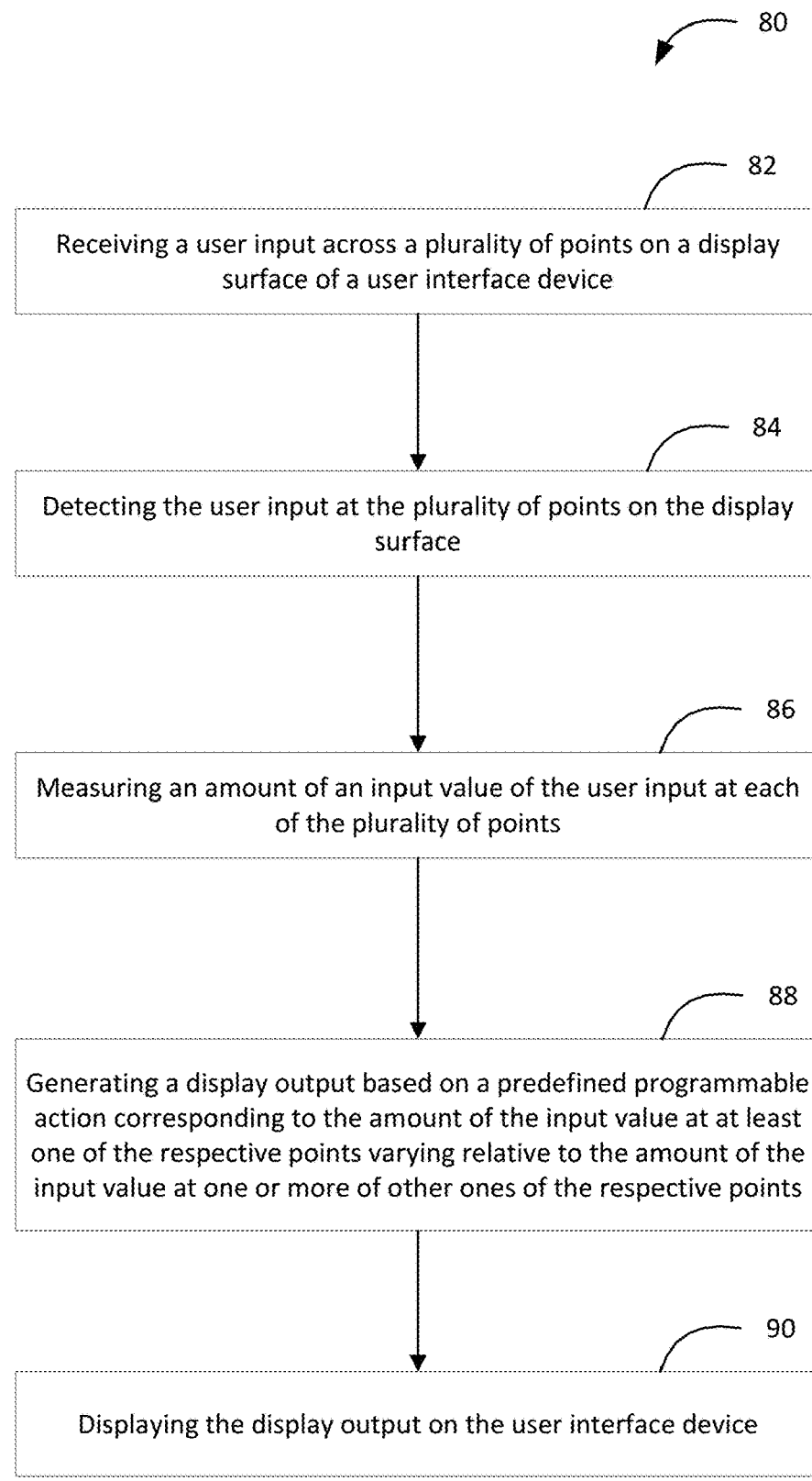
FIG. 8 is a flowchart of a method of generating an output on a display, such as on the computer device of FIG. 1, according to an implementation.

Referring to FIG. 8, one example of a method 80 that may be executable by computer device 12 and/or computer device 30 includes a method of displaying variable display outputs based on variable user input time and/or pressure patterns.

At 82, for example, method 80 includes receiving a user input across a plurality of points on a display surface of a user interface device. For example, in an implementation, the computer device 12 and/or 30 may receive a user input 17 across a plurality of points 25 on a display surface 21 of a user interface device 14. Further details of receiving the user input 17 are described above.

At 84, for example, method 80 includes detecting the user input at the plurality of points on the display surface. For example, in an implementation, the computer device 12 and/or 30 may include the input detector 18 that operates to detect the user input 17 at the plurality of points 25 on the display surface 21. Further details of detecting the user input 17 are described above.

At 86, for example, method 80 includes measuring an amount of an input value of the user input at each of the plurality of points. For example, in an implementation, the computer device 12 and/or 30 may include the measuring device 20 that operates to measure an amount of an input value 29 of the user input 17 at each of the plurality of points 25. Further details of measuring the user input 17 are described above.

At 88, for example, method 80 includes generating a display output based on a predefined programmable action corresponding to the amount of the input value at at least one of the respective points varying relative to the amount of the input value at one or more of other ones of the respective points. For example, in an implementation, the computer device 12 and/or 30 may include the processor 22 that communicates with the memory 24 and is operable to generate the display output 23 based on a predefined programmable action, e.g., one of the plurality of predefined programmable actions 31, corresponding to the amount of the input value at at least one of the respective points, e.g., associated with a recognized one of the plurality of swipe patterns 33, varying relative to the amount of the input value 29 at one or more of other ones of the respective points 25. For instance, when the user input 17 is recognized as having a plurality of points 25 that match one of the plurality of swipe patterns 33, the amount of pressure and/or time of the user input 17 at one or more of the points may be greater or less than the amount of pressure and/or time at other points, and the combination of the these parameters may be utilized to match the plurality of points 25 to a particular one of the plurality of swipe patterns 33 and a corresponding one of the plurality of programmable actions 31.

Additionally, at 82, for example, method 80 includes displaying the display output on the user interface device. For example, in an implementation, the computer device 12 and/or 30 may include display 16 operable to display the display output 23 generated by the processor 22.

In some alternative implementations, the computer device 12 and/or 30 may include the detector being further configured to identify a position of each of the plurality of points, and the processor being configured to recognize the user input across the plurality of points as a swipe pattern matching one of a plurality of swipe patterns based on the position of each of the plurality of points, and map the swipe pattern to the predefined programmable action by selecting the predefined programmable action from a plurality of predefined programmable actions mapped to the plurality of swipe patterns.

In some alternative implementations, the computer device 12 and/or 30 may include the measuring device being further configured to measure the input value as pressure, and to measure an amount of pressure received by the user input at each of the plurality of points of the swipe pattern, and the processor being further configured to compare the amount of pressure at each of the plurality of points with a pressure threshold value for determining which of the plurality of predefined programmable actions maps to the swipe pattern.

In some alternative implementations, the computer device 12 and/or 30 may include the measuring device being further configured to measure the input value as time, and to measure an amount of time the user input was maintained at each of the plurality of points of the swipe pattern, and the processor being further configured to compare the amount of time at each of the plurality of points with a time threshold value for determining which of the plurality of predefined programmable actions maps to the swipe pattern.

In some alternative implementations, the computer device 12 and/or 30 may include the measuring device being configured to measure the input value as pressure over time, and to measure an amount of pressure received by the user input at each of the plurality of points of the swipe pattern and an amount of time the user input was maintained at each of the plurality of points of the swipe pattern, and the processor being further configured to compare the amount of pressure over time at each of the respective points with a pressure over time threshold value for determining which of the plurality of predefined programmable actions maps to the swipe pattern.

In some alternative implementations, when the amount of pressure measured at at least one of the plurality of points exceeds the pressure threshold value, the computer device 12 and/or 30 may include the processor being configured to recognize the user input as a pressurized swipe pattern such that the predefined programmable action corresponding to the swipe pattern is generated.

In some implementations, when the amount of pressure measured at at least one of the plurality of points exceeds the threshold value and the position of the at least one of the plurality of points corresponds to a character on a virtual keyboard, the computer device 12 and/or 30 may include the processor being configured to recognize the user input as a pressurized swipe pattern such that the predefined programmable action corresponding to the pressurized swipe pattern generates the display output having two or more of the character repeated depending on a value of the amount of pressure measured.

In some implementations, when an amount of pressure over time measured at at least one of the plurality of points exceeds the pressure over time threshold value, the computer device 12 and/or 30 may include the processor being configured to recognize the user input as a pressurized swipe pattern such that the predefined programmable action corresponding to the pressurized swipe pattern generates the display output having two or more of the character repeated depending on a value of the amount of pressure over time measured.

In some implementations, when the amount of pressure measured at at least one of the plurality of points exceeds a first threshold value and is less than a second threshold value, and the position of the at least one of the plurality of points corresponds to at least one character on a virtual keyboard, the computer device 12 and/or 30 may include the processor being configured to recognize the user input as a pressurized swipe pattern such that the predefined programmable action corresponding to the pressurized swipe pattern generates the display output having a highlight over the at least one character.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer device, comprising:
   a user interface having a display surface and configured to receive a continuous user input recognized as a single swipe gesture across a plurality of more than two virtual keys of a virtual keyboard on the display surface;
   a detector adjacent to the user interface and configured to detect the continuous user input recognized as the single swipe gesture across the plurality of virtual keys of the virtual keyboard on the display surface;
   a measuring device in communication with the detector and configured to measure an amount of pressure the continuous user input exerts at each of the plurality of virtual keys; and
   a processor in communication with the measuring device and configured to:
      for each particular virtual key of the plurality of virtual keys,
         compare (1) the amount of pressure the continuous user input exerts onto the particular virtual key with (2) the amounts of pressure the continuous user input exerts onto other virtual keys among the plurality of virtual keys, while the single swipe gesture is performed;
         determine a different amount of pressure between (1) the amount of pressure the continuous user input exerts onto the particular virtual key and (2) the amounts of pressure the continuous user input exerts onto the other virtual keys among the plurality of virtual keys, while the single swipe gesture is performed; and
         generate a display output based on a predefined programmable action corresponding to the single swipe gesture and the different amount of pressure, generating the display output comprising:
            when the different amount of pressure is greater than a predetermined threshold, generating a first display output corresponding to the particular virtual key; and
            when the different amount of pressure is less than the predetermined threshold, generating a second display output corresponding to the virtual key that is different from the first display output; and
   a display unit in communication with the processor and configured to: for each of the plurality of virtual keys, display the generated first display output or the generated second display output on the user interface.

2. The device of claim 1,
   wherein the processor is configured to:
      match the single swipe gesture to one of a plurality of swipe gestures based on the plurality of virtual keys; and
      map the swipe gesture to the predefined programmable action by selecting the predefined programmable action from a plurality of predefined programmable actions mapped to the plurality of swipe gestures.

3. The device of claim 1,
   wherein the measuring device is further configured to measure an amount of time the continuous user input was maintained at each of the plurality of virtual keys.

4. The device of claim 1, wherein the predefined programmable action generates the display output repeating two or more of a character of a particular virtual key.

5. The device of claim 1, wherein the predefined programmable action generates the display output having a highlight over at least one character.

6. A method of generating an output on a display, comprising:
   receiving a continuous user input recognized as a single swipe gesture across a plurality of more than two virtual keys of a virtual keyboard on a display surface of a user interface device;

detecting the continuous user input recognized as the single swipe gesture across the plurality of virtual keys of the virtual keyboard on the display surface; measuring an amount of pressure of the continuous user input exerts at each of the plurality of virtual keys;

for each particular virtual key of the plurality of virtual keys,
- comparing (1) the amount of pressure the continuous user input exerts onto the particular virtual key with (2) the amounts of pressure the continuous user input exerts onto other virtual keys among the plurality of virtual keys, while the single swipe gesture is performed;
- determining a different amount of pressure between (1) the amount of pressure the continuous user input exerts onto the particular virtual key and (2) the amounts of pressure the continuous user input exerts onto the other virtual keys among the plurality of virtual keys, while the single swipe gesture is performed; and
- generating a display output based on a predefined programmable action corresponding to the single swipe gesture and the different amount of pressure, generating the display out comprising:
  - when the different amount of pressure is greater than a predetermined threshold, generating a first display output corresponding to the particular virtual key;
  - when the different amount of pressure is less than the predetermined threshold, generating a second display output corresponding to the virtual key that is different from the first display output; and
  - displaying the generated first display output or the generated second display output corresponding to the virtual key on the user interface device.

7. The method of claim 6, further comprising:

matching the single swipe gesture to one of a plurality of swipe gestures based on the plurality of virtual keys; and mapping the swipe gesture to the predefined programmable action by selecting the predefined programmable action from a plurality of predefined programmable actions mapped to the plurality of swipe gestures.

8. The method of claim 6,
wherein the measuring further comprises measuring an amount of time the continuous user input was maintained at each of the plurality of virtual keys.

9. The method of claim 6, wherein the predefined programmable action generates the display output repeating two or more of a character of a particular virtual key.

10. The method of claim 6, wherein the predefined programmable action generates the display output having a highlight over at least one character.

* * * * *